US009896022B1

United States Patent
Pertsel et al.

(10) Patent No.: US 9,896,022 B1
(45) Date of Patent: Feb. 20, 2018

(54) AUTOMATIC BEAM-SHAPING USING AN ON-CAR CAMERA SYSTEM

(71) Applicant: Ambarella, Inc., Santa Clara, CA (US)

(72) Inventors: Shimon Pertsel, Mountain View, CA (US); Alexander Fink, San Jose, CA (US)

(73) Assignee: Ambarella, Inc., Santa Clara, CA (US)

( * ) Notice: Subject to any disclaimer, the term of this patent is extended or adjusted under 35 U.S.C. 154(b) by 203 days.

(21) Appl. No.: 14/690,945

(22) Filed: Apr. 20, 2015

(51) Int. Cl.
| | | |
|---|---|---|
| *B60Q 1/08* | (2006.01) | |
| *B60Q 1/12* | (2006.01) | |
| *B60Q 1/115* | (2006.01) | |
| *H04N 7/18* | (2006.01) | |
| *G06K 9/00* | (2006.01) | |

(52) U.S. Cl.
CPC .............. *B60Q 1/085* (2013.01); *B60Q 1/115* (2013.01); *B60Q 1/122* (2013.01); *G06K 9/00825* (2013.01); *H04N 7/183* (2013.01); *B60Q 2300/112* (2013.01); *B60Q 2300/122* (2013.01); *B60Q 2300/142* (2013.01); *B60Q 2300/322* (2013.01); *B60Q 2300/42* (2013.01); *B60Q 2300/45* (2013.01)

(58) Field of Classification Search
CPC ... B60Q 1/08; B60Q 1/12; B60Q 1/24; B60Q 1/16; B60Q 2300/45; B60Q 1/085; G06K 9/00791; G06K 9/00805; G06K 9/00818
USPC .......................................................... 348/148
See application file for complete search history.

(56) References Cited

U.S. PATENT DOCUMENTS

| | | | | | |
|---|---|---|---|---|---|
| 4,787,739 | A | * | 11/1988 | Gregory | G01C 3/22 356/21 |
| 4,837,842 | A | * | 6/1989 | Holt | G06K 9/00 235/379 |
| 5,499,168 | A | * | 3/1996 | Cochard | B60Q 1/0011 180/169 |
| 5,515,026 | A | * | 5/1996 | Ewert | B60Q 1/525 116/22 A |
| 6,226,389 | B1 | * | 5/2001 | Lemelson | G08G 1/166 382/104 |
| 6,281,806 | B1 | * | 8/2001 | Smith | B60Q 1/085 340/436 |
| 6,293,686 | B1 | * | 9/2001 | Hayami | B60Q 1/085 307/10.8 |

(Continued)

FOREIGN PATENT DOCUMENTS

| | | | |
|---|---|---|---|
| DE | 10060734 | A1 * | 6/2002 |
| DE | 102013203925 | * | 9/2014 |

(Continued)

*Primary Examiner* — David Harvey
(74) *Attorney, Agent, or Firm* — Christopher P. Maiorana, PC

(57) ABSTRACT

An apparatus comprising a sensor, an interface and a processor. The sensor may be configured to generate a video signal based on a targeted view from a vehicle of a perspective of a driver. The interface may be configured to receive status information about one or more components of the vehicle. The processor may be configured to generate a control signal in response to (i) a classification of objects in the video signal and (ii) the status information. The control signal may be used to adjust one or more headlights of the vehicle. The adjustment of the headlights may be based on a location of the objects in the video signal.

20 Claims, 10 Drawing Sheets

(56) References Cited

U.S. PATENT DOCUMENTS

| | | | | |
|---|---|---|---|---|
| 6,363,161 B2* | 3/2002 | Laumeyer | ........ | G06K 9/00818 382/104 |
| 6,556,692 B1* | 4/2003 | Gavrila | ........ | G06K 9/00818 382/104 |
| 7,429,918 B2* | 9/2008 | Watanabe | ........ | B60Q 1/085 340/468 |
| 8,408,765 B2* | 4/2013 | Kuhlman | ........ | B60Q 1/085 362/276 |
| 8,437,918 B2* | 5/2013 | Leleve | ........ | B60Q 1/115 362/465 |
| 8,498,779 B2* | 7/2013 | Nakadate | ........ | B60Q 1/143 701/1 |
| 8,768,576 B2* | 7/2014 | Osanai | ........ | B60Q 1/143 362/466 |
| 9,481,287 B2* | 11/2016 | Marti | ........ | B60Q 1/00 |
| 9,493,109 B2* | 11/2016 | Nordbruch | ........ | B60Q 1/085 |
| 9,514,372 B2* | 12/2016 | Feid | ........ | G06K 9/00798 |
| 9,690,997 B2* | 6/2017 | Murao | ........ | G06K 9/00825 |
| 2001/0019486 A1* | 9/2001 | Thominet | ........ | F21S 48/1131 362/543 |
| 2002/0036901 A1* | 3/2002 | Horii | ........ | B60Q 1/12 362/37 |
| 2002/0039294 A1* | 4/2002 | Okuchi | ........ | B60Q 1/1423 362/464 |
| 2002/0080618 A1* | 6/2002 | Kobayashi | ........ | B60Q 1/085 362/466 |
| 2004/0114921 A1* | 6/2004 | Braun | ........ | B60Q 9/008 396/661 |
| 2004/0178738 A1* | 9/2004 | Brun | ........ | B60Q 1/10 315/82 |
| 2004/0201483 A1* | 10/2004 | Stam | ........ | B60Q 1/1423 340/600 |
| 2004/0252516 A1* | 12/2004 | Brun | ........ | B60Q 1/0011 362/465 |
| 2005/0047113 A1* | 3/2005 | Nishimura | ........ | B60Q 1/12 362/37 |
| 2005/0131608 A1* | 6/2005 | Sugimoto | ........ | B60Q 1/12 701/49 |
| 2006/0023461 A1* | 2/2006 | Knight | ........ | B60Q 1/076 362/466 |
| 2006/0044783 A1* | 3/2006 | Morishita | ........ | B60Q 1/12 362/37 |
| 2006/0204107 A1* | 9/2006 | Dugan | ........ | G06K 9/00664 382/217 |
| 2007/0102214 A1* | 5/2007 | Wittorf | ........ | B60Q 1/50 180/167 |
| 2008/0215231 A1* | 9/2008 | Breed | ........ | G08G 1/161 701/117 |
| 2008/0260207 A1* | 10/2008 | Nagaoka | ........ | G06T 7/0002 382/103 |
| 2009/0016073 A1* | 1/2009 | Higgins-Luthman | .. | B60Q 1/085 362/465 |
| 2009/0062992 A1* | 3/2009 | Jacobs | ........ | B60Q 1/085 701/49 |
| 2009/0185718 A1* | 7/2009 | Moritz | ........ | B60Q 1/085 382/104 |
| 2010/0265330 A1* | 10/2010 | Li | ........ | B60Q 1/143 348/148 |
| 2011/0116687 A1* | 5/2011 | McDonald | ........ | G06K 9/00785 382/105 |
| 2011/0234422 A1* | 9/2011 | Yamashita | ........ | B60Q 5/006 340/901 |
| 2012/0062746 A1* | 3/2012 | Otsuka | ........ | H04N 7/18 348/148 |
| 2012/0093372 A1* | 4/2012 | Liu | ........ | G01C 3/08 382/106 |
| 2012/0226412 A1* | 9/2012 | Nakadate | ........ | B60Q 1/143 701/36 |
| 2012/0281878 A1* | 11/2012 | Matsuda | ........ | G06T 7/0046 382/103 |
| 2013/0027951 A1* | 1/2013 | Takahashi | ........ | B60Q 1/085 362/465 |
| 2013/0051618 A1* | 2/2013 | Foltin | ........ | B60Q 1/085 382/103 |
| 2013/0148368 A1* | 6/2013 | Foltin | ........ | B60Q 1/08 362/466 |
| 2013/0238186 A1* | 9/2013 | Aimura | ........ | B60Q 1/085 701/36 |
| 2013/0242586 A1* | 9/2013 | Huizen | ........ | B60R 1/12 362/494 |
| 2013/0258688 A1* | 10/2013 | Kalapodas | ........ | B60Q 1/085 362/465 |
| 2013/0343071 A1* | 12/2013 | Nagaoka | ........ | B60Q 9/008 362/466 |
| 2014/0071702 A1* | 3/2014 | Faber | ........ | B60Q 1/085 362/466 |
| 2015/0003087 A1* | 1/2015 | Futamura | ........ | B60Q 1/143 362/466 |
| 2016/0119509 A1* | 4/2016 | Wato | ........ | H04N 5/2251 348/148 |
| 2016/0193956 A1* | 7/2016 | Foltin | ........ | B60Q 1/143 362/466 |

FOREIGN PATENT DOCUMENTS

| | | | |
|---|---|---|---|
| EP | 1780462 A1 | * | 5/2007 |
| WO | WO 2015/118890 A1 | * | 8/2015 |

* cited by examiner

AUTOMATIC BEAM-SHAPING USING AN ON-CAR CAMERA SYSTEM

FIELD OF THE INVENTION

The present invention relates to video capture devices generally and, more particularly, to automatic beam-shaping using an on-car camera system.

BACKGROUND OF THE INVENTION

Vehicle headlights are designed to illuminate upcoming roadways in front of a driver. When roadways curve, the areas of the roadway around the curve are often left completely unlit and the effective visibility range of the driver becomes significantly shorter. For instance, if the roadway curves to the right with a radius of 50 m, a typical 30 m headlight will only illuminate 5-10 m of the roadway. Oncoming vehicles, pedestrians, animals, and other obstacles around the curve are not visible to the driver.

Some car manufacturers have attempted to improve headlights by introducing adaptive headlights and beam-shaping. Typically, adaptive headlights and beam-shaping use steering data from the vehicle. Current adaptive headlight technology improves the visibility, but only after the driver moves the steering wheel and the vehicle is already traveling in the curve. When the vehicle is already in the curve, the driver might not have enough time to react to an obstacle. Current adaptive headlight technology does not help when the vehicle is approaching, but has not yet reached, the curve.

It would be desirable to implement automatic beam-shaping using an on-car camera system.

SUMMARY OF THE INVENTION

The present invention concerns an apparatus comprising a sensor, an interface and a processor. The sensor may be configured to generate a video signal based on a targeted view from a vehicle of a perspective of a driver. The interface may be configured to receive status information about one or more components of the vehicle. The processor may be configured to generate a control signal in response to (i) a classification of objects in the video signal and (ii) the status information. The control signal may be used to adjust one or more headlights of the vehicle. The adjustment of the headlights may be based on a location of the objects in the video signal.

The objects, features and advantages of the present invention may (i) implement automatic beam-shaping, (ii) use an on-car camera system, (iii) be easy to implement and/or cost effective, (iv) detect objects in video frames, (v) shape headlight beams based on detected lane changes, (vi) improve illumination when approaching curved roads and/or intersections, (vii) illuminate oncoming vehicles without reducing visibility of drivers of oncoming vehicles, (viii) detect objects/items based on communication data and/or (ix) receive information from vehicle sensors.

BRIEF DESCRIPTION OF THE DRAWINGS

These and other objects, features and advantages of the present invention will be apparent from the following detailed description and the appended claims and drawings in which:

DETAILED DESCRIPTION OF EMBODIMENTS

Figure 1:
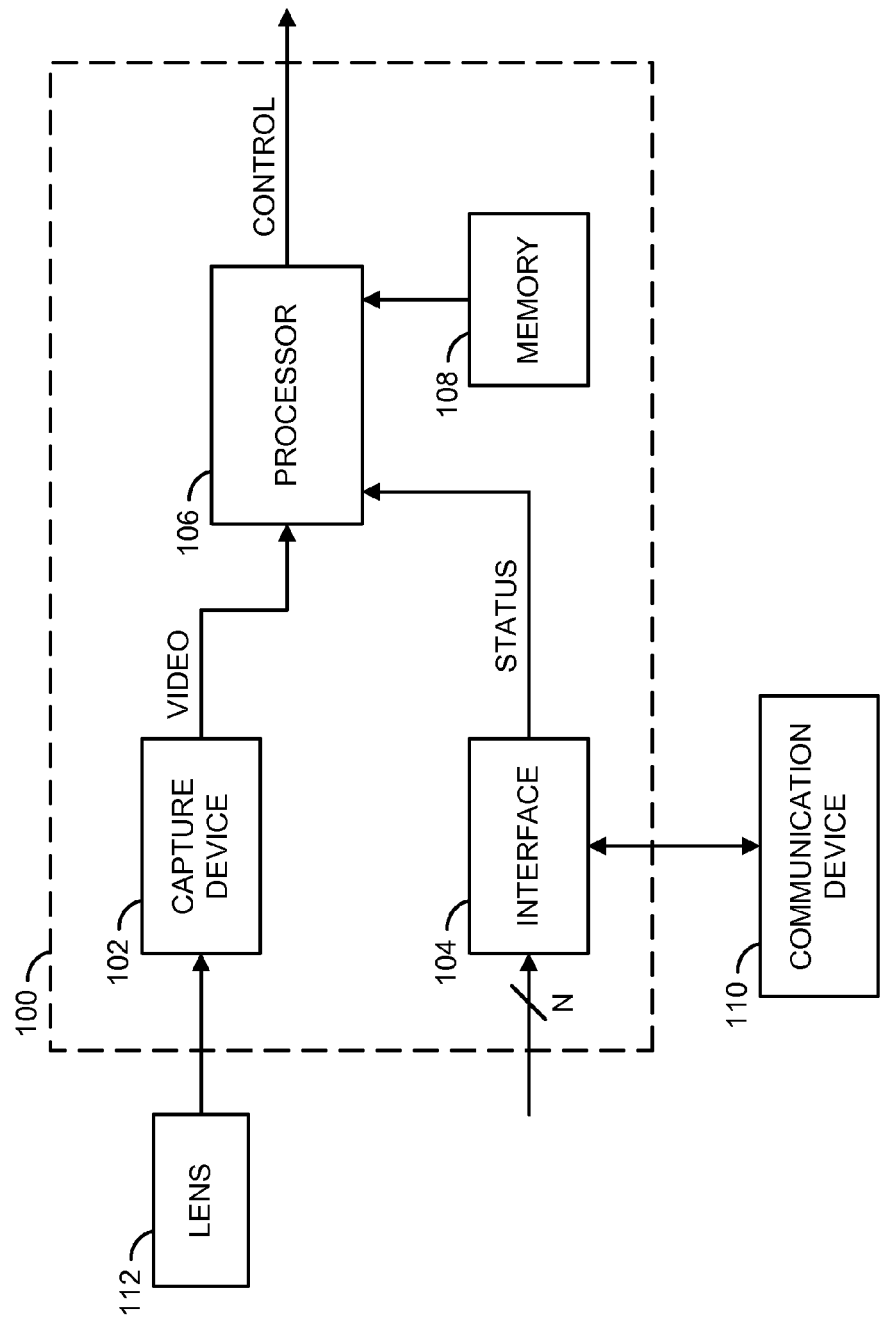
FIG. 1 is a block diagram of an example embodiment of an apparatus.

Referring to FIG. 1, a block diagram of an apparatus 100 is shown in accordance with an embodiment of the present invention. The apparatus 100 may be a camera system. The camera system 100 may comprise a block (or circuit) 102, a block (or circuit) 104, a block (or circuit) 106, and a block (or circuit) 108. The circuit 102 may implement a capture device. The circuit 104 may implement an interface. The circuit 106 may be configured as a processor. The circuit 108 may be configured as a memory. The camera system 100 is shown connected to a block (or circuit) 110. The circuit 110 may be an external communication device. In some embodiments, the communication device 110 may be implemented as part of the camera system 100. The camera system 100 is shown receiving input from a block (or circuit) 112. The block 112 may be a lens (e.g., a camera lens). In some embodiments, the lens 112 may be implemented as part of the camera system 100. In some embodiments, the camera system 100 may be implemented as a drop-in solution (e.g., installed as one component).

The capture device 102 may present a signal (e.g., VIDEO) to the processor 106. The interface 104 may present a signal (e.g., STATUS) to the processor 106. The processor 106 may be configured to receive the signal VIDEO and/or the signal STATUS. The processor 106 may be configured to generate a signal (e.g., CONTROL). The inputs, outputs and/or arrangement of the components of the camera system 100 may be varied according to the design criteria of a particular implementation.

Figure 2:
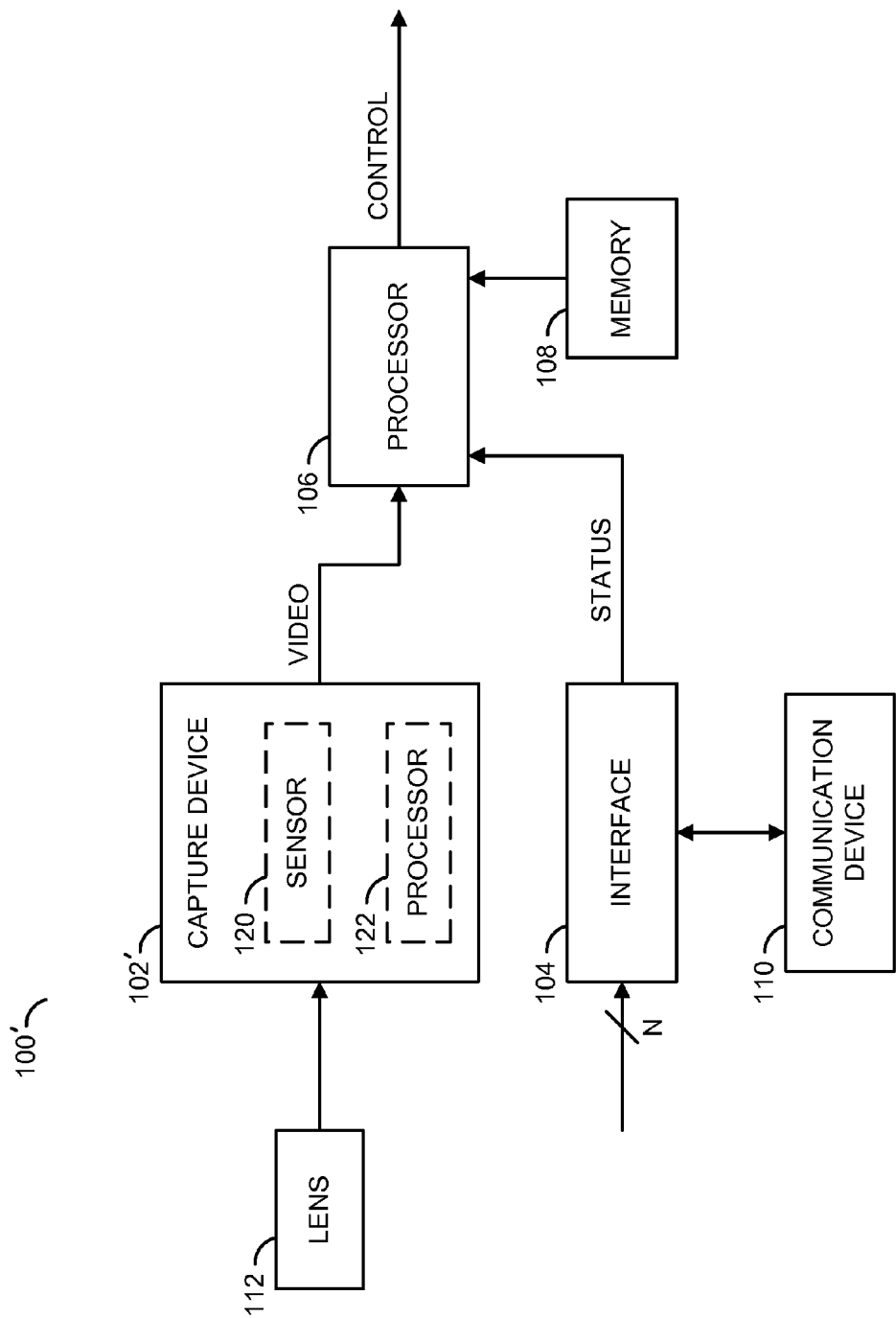
FIG. 2 is a block diagram of another example embodiment of an apparatus.

Referring to FIG. 2, a block diagram of an apparatus 100' is shown in accordance with an embodiment of the present invention. The camera system 100' may comprise a capture device 102', the interface 104, the processor 106, the memory 108, the communication device 110 and/or the lens 112. The camera system 100' may be a distributed system (e.g., each component may be implemented separately throughout the vehicle 50). The capture device 102' may comprise a block (or circuit) 120 and/or a block (or circuit) 122. The circuit 120 may be a sensor. The circuit 122 may be a processor (e.g., a processor separate from the processor 106). The capture device 102' may implement a separate memory.

Figure 3:
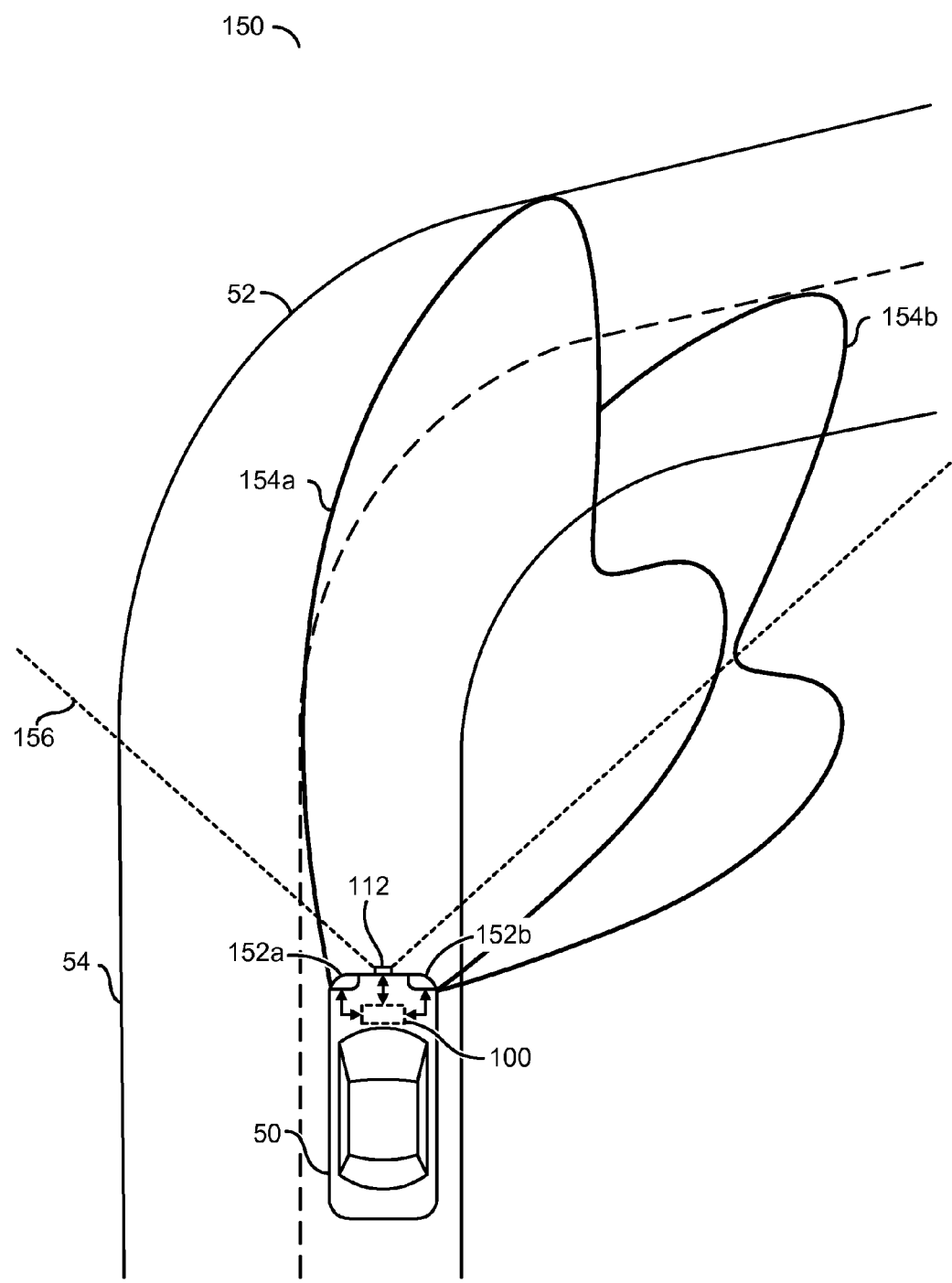
FIG. 3 is a diagram illustrating an apparatus detecting a roadway curve and adjusting headlight beams.

Referring to FIG. 3, an embodiment 150 illustrating the camera system 100 detecting a roadway curve 52 is shown. The camera system 100 is shown inside a vehicle 50. The vehicle 50 is shown driving on a roadway 54. The roadway 54 is shown extending into the roadway curve 52.

The lens 112 (e.g., attached to the capture device 102) is shown mounted on a front end of the vehicle 50. Front headlights 152a-152b are shown attached to the vehicle 50. In the embodiment 150, two front headlights (e.g., the headlights 152a-152b) are shown. In some embodiments, the vehicle 50 may have more than two headlights (e.g., headlights 152a-152n) aimed in various directions. The number and/or direction of the headlights 152a-152n may be varied according to the design criteria of a particular implementation.

The headlights 152a-152b are shown emitting corresponding beams 154a-154b. The beams 154a-154b are shown illuminating the roadway curve 52. The headlights 152a-152b may be configured to shape and/or direct the beams 154a-154b. For example, the headlights 152a-152b may shape the beams 154a-154b as the vehicle 50 approaches the roadway curve 52. In some embodiments, the headlights 152a-152b may be rotated and/or mirrors/reflective surfaces in the headlight capsule may be rotated to direct and/or shape the beams 154a-154b. The method of shaping and/or directing the beams 154a-154b may be varied according to the design criteria of a particular implementation.

The camera system 100 is shown located in the front of the vehicle 50. A location of the camera system 100 may be varied according to the design criteria of a particular implementation. For example, in some embodiments, the vehicle 50 may allow installation of the camera system 100 in a rear portion of the vehicle 50. In other embodiments, the vehicle 50 may allow installation of the camera system 100 in a front portion of the vehicle 50. For example, the camera system 100 may be installed near and/or with the capture device 102 (e.g., on a dashboard of the vehicle 50). In another example, the camera system 100 (or the camera system 100') may be distributed throughout the vehicle 50 (e.g., connections may be implemented between the camera system 100 (or the camera system 100') and the capture device 102 (or the capture device 102') such as a direct wired connection and/or a connection using a common bus line.

Generally, an orientation of the headlights 152a-152b may be configured to illuminate the roadway 54 in front of the vehicle 50. In some embodiments, a position/orientation of the headlights 152 may be adjustable using manual controls in the vehicle 50 available to a driver (e.g., buttons on a panel on the inside of the door beside the driver, buttons on a center console, an interface on a touchscreen, buttons on a steering wheel, etc.). The camera system 100 may adjust the position/orientation (e.g., shape the beams 154a-154b) of the side headlights 152a-152n automatically based on objects (or items) detected in a field of view (FOV) 156 of the camera system 100 determined by the processor 106. In some embodiments, the camera system 100 may shape the beams 154a-154b of the headlights 152a-152b and the driver of the vehicle 50 may make further adjustments and/or fine-tune the positioning of the headlights 152a-152b using the manual controls. In some embodiments, the vehicle 50 may be configured to move the headlights 152a-152b (e.g., in response to the driver turning a steering wheel).

The field of view 156 of the camera system 100 is shown detecting the roadway curve 52. The camera system 100 may detect the roadway curve 52 based on detected objects/items. Based on the detected objects, the processor 106 may determine a shape and/or orientation of the beams 154a-154b to illuminate the roadway curve 52.

The vehicle 50 is shown having the headlights 152a-152b. The headlight 152a may be a front headlight on the driver side of the vehicle 50. The headlight 152b may be a front headlight on the passenger side of the vehicle 50. The lens 112 is shown between the headlights 152a-152b. In some embodiments, the lens 112 may be located at one or more locations on the vehicle 50. For example, multiple capture devices 102 may be implemented and each capture device 102 may have a corresponding lens 112. Implementing more than one capture device 102 (or lens 112) may provide various perspectives and/or viewing angles. For example, additional headlights may be aimed behind the driver illuminating a read end of the vehicle. In another example, additional headlights (e.g., roof-mounted floodlights) may be mounted to illuminate a side of the vehicle 50 (e.g., to improve visibility for lane changes). In some embodiments, a capture device 102 may be implemented for each perspective view for each headlight of the vehicle 50. The number of capture devices 102 implemented may be varied according to the design criteria of a particular implementation.

The FOV 156 may represent a range of view of the capture device 102. For example, the FOV 156 may have a wider and/or extended range of view compared to the driver. The FOV 156 may represent a targeted view of a perspective of the driver. In some embodiments, the capture device 102 may implement night vision to improve detection of objects/items in low light conditions. Based on the objects/items detected in the FOV 156, the beams 154a-154b may be shaped such that blind spots and/or dark zones are eliminated, reduced and/or minimized. Shaping the beams 154a-154b to illuminate dark areas may improve safety when driving at night (e.g., driving on curved roads, changing lanes, driving on dark county roads, driving by intersections and/or driveways, etc.).

Each of the headlights 152a-152b is shown connected to the camera system 100. The lens 112 is shown connected to the camera system 100. The headlights 152a-152b may send status information to the camera system 100 (e.g., to the interface 104). The camera system 100 may send the signal CONTROL to each of the headlights 152a-152b to adjust and/or shape the beams 154a-154b. In some embodiments, the signal CONTROL may be sent to the interface 104 to the headlights 152a-152b. For example, internal mechanics of the headlights 152a-152b may be rotated to move the beams 154a-154b over a range (e.g., side-to-side and/or up-and-down). In another example, mirrors and/or reflective surfaces in the headlight enclosure may be adjusted to shape the beams 154a-154b.

The camera system 100 may be implemented to calculate positioning/orientation of the headlights 152a-152b for the vehicle 50 (e.g., a car, a truck, a motorcycle and/or any type of automobile). The beams 154a-154b may be calculated and/or determined based on information received from the headlights 152a-152b (e.g., status information such as a current orientation of the beams 154a-154b). For example, the status information may be sent from the headlights 152a-152b and/or the beams 154a-154b to the processor 106 via the interface 104. The calculated shape of the beams 154a-154b may be based on the detected objects/items in the FOV 156 (e.g., objects and/or other obstacles). The camera system 100 may determine the corresponding shape of the beams 154a-154b for each of the headlights 152a-152b of the vehicle 50. A number of beam shapes may be determined (e.g., one for each of the headlights 152a-152n of the vehicle 50). For example, the vehicle 50 may have two headlights (e.g., the driver side headlight 152*a* and the passenger side headlight 152*b*) and there may be two corresponding beams 154*a*-154*b* determined by the camera system 100.

The camera system 100 may interface with other systems of the automobile 50 to shape each of the beams 154*a*-154*b* (e.g., each beam may be shaped independently) automatically. The beams 154*a*-154*b* may be shaped to reduce and/or eliminate dark approaching roadways. For example, the shape of the beams 154*a*-154*b* may be calculated based on characteristics of the detected objects/items (e.g., a location of the detected object/item, a size of the detected object/item, a classification of the detected object/item, etc.). Different types of detected objects/items and/or shapes of the beams 154*a*-154*b* determined in response to the detected objects/items will be discussed below. For example, the shape of the beams 154*a*-154*b* may be determined based on the range of the beams 154*a*-154*b*.

In some embodiments, the camera system 100 may be installed in the vehicle 50 at a time of manufacturing. For example, the camera system 100 may be installed on a particular type (e.g., model, make, year, etc.) of vehicle 50 and the camera system 100 may store pre-determined status information about the vehicle 50 (e.g., a size, a height, driver positioning, range of the beams 154*a*-154*b*, a range of rotation of the headlights 152*a*-152*b*, beam shape options, etc.).

In some embodiments, the camera system 100 may be installed in the vehicle 50 as a separate component (e.g., an after-market part). In one example, the camera system 100 may be designed and/or sold for a particular make/model of the vehicle 50 and store pre-determined status information (e.g., in the memory 108). In another example, the camera system 100 may be programmable and the status information may be entered in the camera system 100 based on the status information of the vehicle 50. For example, an online database may be implemented with status information for various types of vehicles (e.g., make, model, year, etc.) and the status information may be downloaded and stored in the camera system 100. The implementation of the camera system 100 in the vehicle 50 and/or a method of storing information about the vehicle 50 may be varied according to the design criteria of a particular implementation.

The capture device 102 may capture video image data (e.g., from the lens 112 and/or many of the lenses 112). In some embodiments, the capture device 102 may be a video capturing device such as a camera. In some embodiments, the capture device 102 may be a component of a camera (e.g., a camera pre-installed in the vehicle 50). The capture device 102 may capture data received through the lens 112 to generate a bitstream (e.g., generate video frames). For example, the capture device 102 may receive light from the lens 112. The lens 112 may be directed at a targeted view from the vehicle 50 to provide a perspective of the driver (e.g., a targeted view of what the driver may normally see when operating the vehicle 50). For example, the targeted view of the driver may be the FOV 156. In some embodiments, the FOV 156 may provide a greater range of view than an average driver would be able to see. The capture device 102 may transform the received light into digital data (e.g., a compressed or encoded bitstream). In some embodiments, the capture device 102 may perform an analog to digital conversion. For example, the capture device 102 may perform a photoelectric conversion of the light received by the lens 112. The capture device 102 may transform the bitstream into video data, a video file and/or video frames (e.g., perform decoding). For example, the video data may be a digital video signal. The digital video signal may comprise video frames (e.g., sequential digital images).

The video data may be represented as the signal/bitstream/data VIDEO (e.g., a digital video signal). The capture device 102 may present the signal VIDEO to the processor 106. The signal VIDEO may represent the video frames/video data. The signal VIDEO may be a video stream captured by the capture device 102. In some embodiments, the capture device 102 may be implemented in the camera. In some embodiments, the capture device 102 may be configured to add to existing functionality of the camera (e.g., a camera pre-installed on the vehicle 50).

The capture device 102 may be installed in the vehicle 50 (e.g., in the interior of the car 50 directed at the roadway 54 to provide a perspective of the view of the driver). In some embodiments, the capture device 102 may be pre-installed in the vehicle 50 and the camera system 100 may connect to the capture device 102. In other embodiments, the capture device 102 may be part of the camera system 100. The capture device 102 may be configured to provide night vision. The capture device 102 may be configured for object/obstacle/item detection. For example, the capture device 102 may be implemented to detect objects/items and/or obstacles (e.g., other vehicles, trees, animals, pedestrians, etc.) to warn the driver. In another example, the capture device 152 may record usage of the vehicle 50, (e.g., for use in determining insurance-related issues). The capture device 102 may be configured to recognize items (or objects) and/or obstacles through video and/or image recognition (e.g., road markings, a path of upcoming roadways, lane markers, lane boundaries, intersecting roadways, etc.). The camera system 100 may be configured to leverage pre-existing functionality of the pre-installed capture device 102. The implementation of the capture device 102 may be varied according to the design criteria of a particular implementation.

In some embodiments, the capture device 102' may implement the sensor 120 and/or the processor 122. The sensor 120 may receive light from the lens 112 and transform the light into digital data (e.g., the bitstream). For example, the sensor 120 may perform a photoelectric conversion of the light from the lens 112. The processor 122 may transform the bitstream into a human-legible content (e.g., video data). For example, the processor 122 may receive pure (e.g., raw) data from the sensor 120 and generate (e.g., encode) video data based on the raw data (e.g., the bitstream). The capture device 102' may have a memory to store the raw data and/or the processed bitstream. For example, the capture device 102' may implement a frame memory and/or buffer to store (e.g., provide temporary storage and/or cache) one or more of the video frames (e.g., the digital video signal). The processor 122 may perform analysis on the video frames stored in the memory/buffer of the capture device 102'. For example, the video frames stored in the memory/buffer may be in a format that may allow the processor 106 and/or the processor 122 to perform analysis.

In some embodiments the capture device 102' may be configured to determine a location of the detected objects/items (e.g., various types of detected objects/items will be described in more detail below). For example, the processor 122 may analyze the captured bitstream (e.g., using machine vision processing), determine a location of the detected objects/items and present the signal VIDEO (e.g., comprising information about the detected objects/items) to the processor 106. The processor 122 may be configured to determine the location of the detected objects/items (e.g., less analysis is performed by the processor 106). In another example, the processor 122 may generate the signal VIDEO comprising video frames and the processor 106 may analyze the video frames to determine the location of the detected objects/items (e.g., more analysis is performed by the processor 106). The analysis performed by the processor 122 and/or the processor 106 may be varied according to the design criteria of a particular implementation.

The interface 104 may receive data from one or more components of the vehicle 50. The signal STATUS may be generated in response to the data received from the components of the vehicle 50. In some embodiments, the interface 104 may receive data from the processor 106 (e.g., the signal CONTROL). The interface 104 may send data (e.g., instructions) from the processor 106 to the components of the vehicle 50. The data from the components of the vehicle 50 may be a seat position, a seat recline position, an angle of the bottom seat cushion, a mirror orientation, a status of the headlights 152a-152n, an orientation of the beams 154a-154n, a speed of the vehicle, any information available received from an on-board diagnostics (OBD) port of the vehicle 50, etc. The type of data (e.g., in the signal STATUS) and/or the number of components of the vehicle 50 that provide data may be varied according to the design criteria of a particular implementation.

The processor 106 may be configured to execute computer readable code and/or process information. The processor 106 may be configured to receive input and/or present output to the memory 108. The processor 106 may be configured to present and/or receive other signals (not shown). The number and/or types of inputs and/or outputs of the processor 106 may be varied according to the design criteria of a particular implementation.

In some embodiments, the processor 106 may receive the signal VIDEO from the capture device 102 and detect objects/items in the video frames of the signal VIDEO. In some embodiments, the processor 122 may be configured to detect the objects/items and send the signal VIDEO comprising information about the detected objects/items to the processor 106 (e.g., the processor 106 may receive the location of the objects/items from the capture device 102'). In some embodiments, the processor 106 may be configured to analyze the video frames (e.g., perform a classification of the objects/items detected in the signal VIDEO). The processor 106 may be configured to detect a location and/or position of the classified objects/items in the video frames. The processor 106 may determine a location (e.g., a distance) of the objects/items and/or an amount of illumination of the objects/items by the beams 154a-154b from the camera based on information from the signal STATUS. In some embodiments, the processor 106 may receive the location of the objects/items from the capture device 102' (e.g., the signal VIDEO) and an orientation, position and/or status of the beams 154a-154b through the interface 104 (e.g., the signal STATUS). The information received by the processor 106 and/or the analysis performed by the processor 106 may be varied according to the design criteria of a particular implementation.

Based on the distance and/or location of the objects/items and/or an amount of illumination of areas of the targeted view of the driver (e.g., the FOV 156), the processor 106 may determine an orientation for the beams 154a-154b. The amount of illumination of the targeted view of the driver may be based on the signal VIDEO and/or the signal STATUS. For example, the amount of illumination of the targeted view of the driver may be based on a classification of the objects/items in the signal VIDEO. The processor 106 may generate the signal CONTROL in response to the determined objects/items and/or the amount of illumination of the targeted view of the driver 156.

The signal CONTROL may be implemented to provide instructions to the various components of the vehicle 50. For example, the signal CONTROL may be used by the headlights 152a-152b to adjust an orientation of the beams 154a-154b (e.g., based on the classification of the determined objects/items and/or the amount of illumination of the targeted view of the driver 156). The orientation of the beams 154a-154b may be an angle, a location and/or a position of a compartment of the headlights 152a-152b (e.g., any characteristic of the headlights 152a-152b and/or the beams 154a-154b that may affect the amount of illumination of the targeted view of the driver 156). In some embodiments, the signal CONTROL may be presented to the interface 104 and the interface 104 may pass the signal CONTROL to one of the components of the vehicle 50. In some embodiments, the signal CONTROL may be presented directly to one of the components of the vehicle 50 by the processor 106.

The processor 106 and/or the processor 122 may be implemented as an application specific integrated circuit (e.g., ASIC) or a system-on-a-chip (e.g., SOC). The processor 106 and/or the processor 122 may be configured to determine a current size of an object/item. The processor 106 and/or the processor 122 may detect an object/item in each video frame. The processor 106 and/or the processor 122 may determine a number of pixels (e.g., a width and/or a height) comprising the object/item in the video frame. Based on the number of pixels of the object/item in the video frame, the processor 106 and/or the processor 122 may estimate a distance of the object/item from the lens 112. Whether the detection of the object/item is performed by the processor 106 and/or the processor 122 may be varied according to the design criteria of a particular implementation.

The memory 108 may store data. The memory 108 may be implemented as a cache, flash memory, DRAM memory, etc. The type and/or size of the memory 108 may be varied according to the design criteria of a particular implementation. The data stored in the memory 108 may correspond to the objects/items and/or video frames. For example, the memory 108 may store a reference size of the objects/items (e.g., the number of pixels of the objects/items in a video frame at a known distance and/or a shape/color of the objects/items). The reference size stored in the memory 108 may be used to compare the current size of the objects/items detected in a current video frame. The comparison of the size of the objects/items in the current video frame and the reference size may be used to determine an orientation of the beams 154a-154b. For example, the memory 108 may store a look up table of the various objects/items. The look up table may be updateable. The look up table may be used by the processor 106 and/or the processor 122 to recognize the various objects/items in the video frames.

The memory 108 may store the pre-determined status information of the vehicle 50. For example, the status information of the vehicle 50 may be updated by overwriting the status information stored in the memory 108. In some embodiments, the memory 108 may store pre-defined preferences (e.g., an orientation of the beams 154a-154b and/or any of the information normally transmitted in the signal STATUS) for each driver. In some embodiments, the memory 108 may store location information about objects/items received by the communication device 110.

The communication device 110 may send and/or receive data to/from the interface 104. In some embodiments, the communication device 110 may be the OBD of the vehicle 50. In some embodiments, the communication device 110 may be implemented as a satellite (e.g., a satellite connection to a proprietary system). For example, the satellite 110 may receive data from one or more vehicles (e.g., location information about the vehicles). In some embodiments, the communication device 110 may receive GPS data. For example, the GPS data may provide location information about various objects/items.

The data received by the satellite 110 may be used by vehicle manufacturers to improve the driving experience and/or detect problems with vehicles. The data received by the satellite 110 may be used to provide roadside assistance. For example, aggregate data from the communication device 110 may determine various types of objects/items (e.g., windshields of various makes/models of oncoming vehicles, signs, road curves, road types, obstacles, geolocation data associated with the objects/items, etc.). In another example, the communication device 110 may be used to provide updates (e.g., to the status information and/or reference data corresponding to the objects/items stored in the memory 108).

The communication device 110 may implement vehicle-to-vehicle communication. In one example, other vehicles may provide location information to the communication device 110. In another example, the communication device 110 may receive position information from an approaching vehicle through a vehicle to vehicle identification system that may be used by the camera system 100 to detect the curve 52. In some embodiments, the communication device 110 may implement a wireless and/or cellular communication system (e.g., a 4G LTE connection). In some embodiments, the communication device 110 may provide a connection to a device of the driver (e.g., a Bluetooth connection to a smartphone, a ZigBee connection to a mesh network of interconnected devices, a Wi-Fi connection to a tablet computing device, etc.). The implementation of the communication device 110 may be varied according to the design criteria of a particular implementation.

The lens 112 (e.g., a camera lens) may be directed at the targeted view of the driver 156 (e.g., directed towards the exterior of the vehicle 50 to provide a targeted view representing the perspective of the driver). For example, the lens 112 may be mounted on a dashboard of the vehicle 50. In another example, the lens 112 may be mounted externally on a front end of the vehicle 50. In yet another example, the lens 112 may be mounted and/or directed at a side or rear end of the vehicle 50. The lens 112 may be aimed to capture environmental data (e.g., light). The lens 112 may be configured to capture and/or focus the light for the capture device 102. Generally, the sensor 120 is located behind the lens 112. Based on the captured light from the lens 112, the capture device 102 may generate a bitstream and/or video data.

Figure 4:
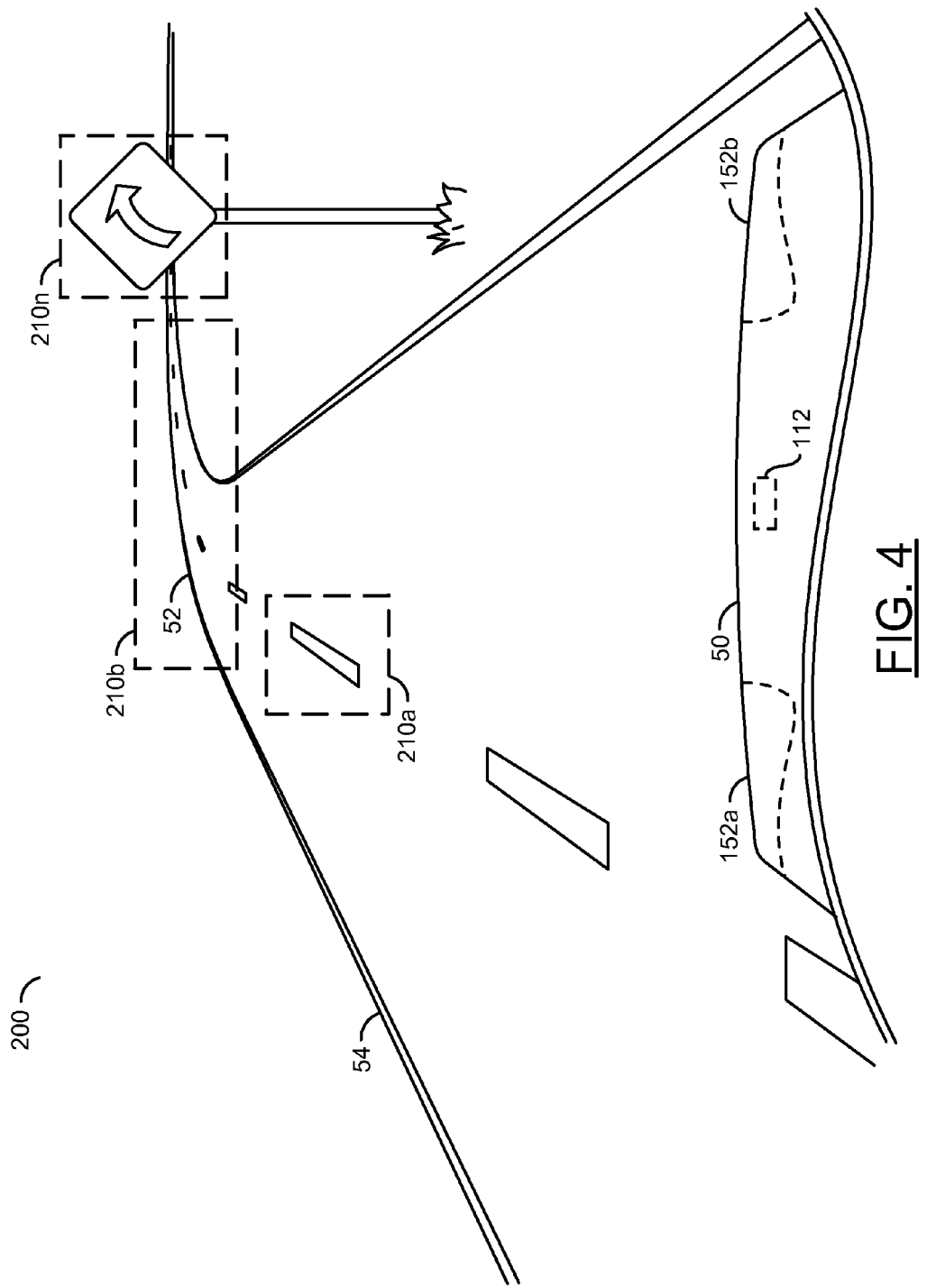
FIG. 4 is a diagram illustrating an example of object/item detection.

Referring to FIG. 4, a diagram illustrating an example view 200 representing object/item detection is shown. The view 200 is from a perspective of a driver of a vehicle. For example, the view 200 may be similar to what a driver sees looking through a windshield. The view 200 may represent the FOV 156. In the embodiment shown, the lens 112 is shown mounted to the front of the vehicle 50. For example, the view 200 may be from one lens, while the lens 112 provides another perspective. The number of perspectives used by the camera system 100 may be varied to meet the design criteria of a particular implementation.

A number of detected objects/items 210a-210n are shown. The particular number of objects 210a-210n may be varied to meet the design criteria of a particular implementation. The detected object 210a may be the line marker (e.g., road markings) of the road 54. The detected object 210b may be the curve 52 in the road 54 (e.g., the path of the upcoming roadway). The detected object 210n may be a traffic sign illustrating the expected curve in the road 54. Other objects/items may be detected to meet the design criteria of a particular implementation. For example, oncoming headlights, lane markers, lane boundaries, intersecting roadways, animals, pedestrians, curbs, a lane divider, a concrete barrier and/or other objects/items of interest may be detected. The headlights 152a-152b may be adjusted to change an orientation of the corresponding beams 154a-154b based on the detected objects 210a-210n.

Figure 5:
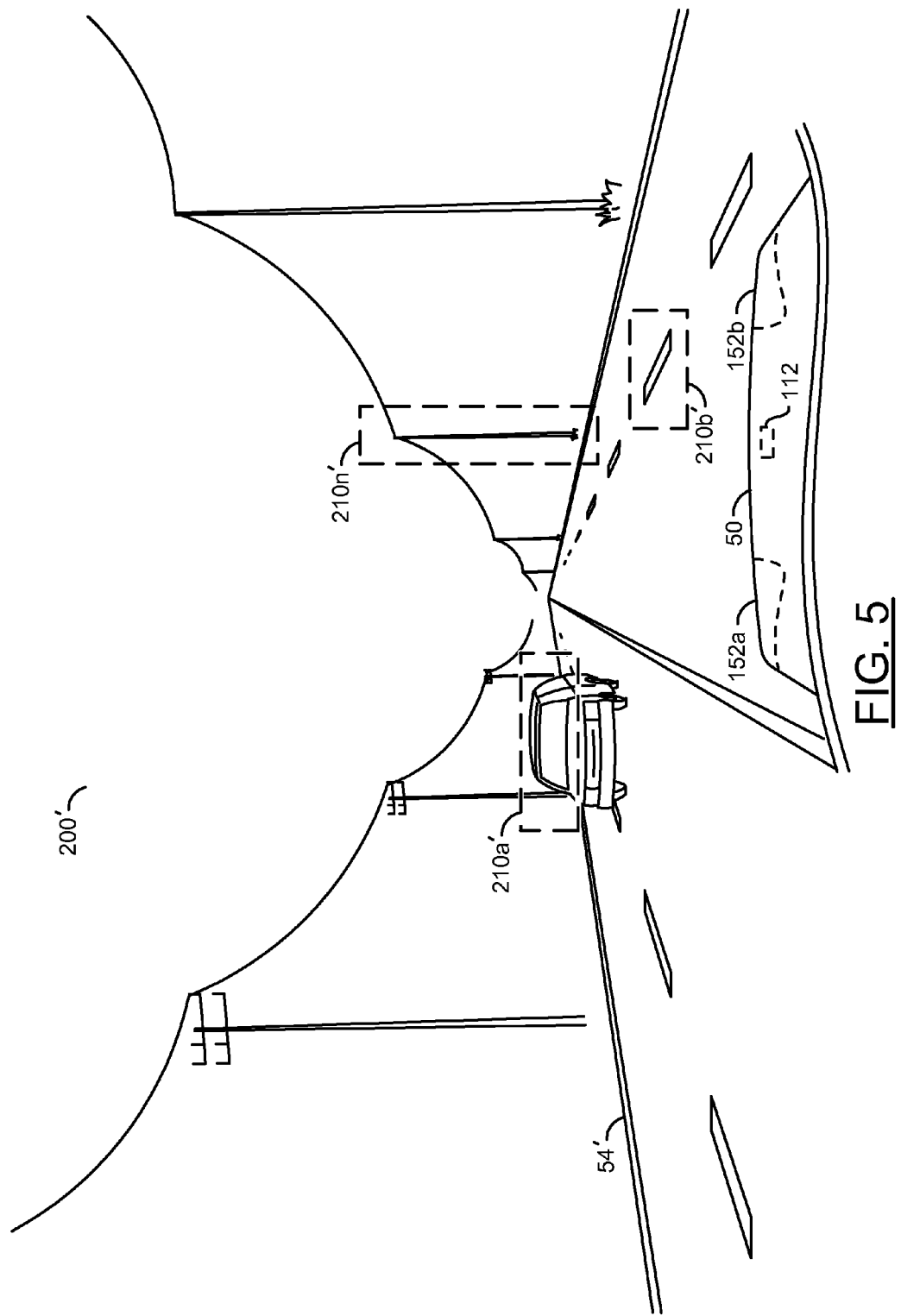
FIG. 5 is a diagram illustrating an alternate example of object/item detection.

Referring to FIG. 5, a diagram illustrating an alternate view 200' representing an example of object/item detection is shown. For example, the alternate view 200' may represent the FOV 156. The alternate view 200' shows a detected object 210a', a detected object 210b' and a detected object 210n'. The detected object 210a' may be a windshield of an oncoming vehicle. The detected object 210b' may be an alternate lane marker. The detected object 210n' may be a utility pole. The particular number and/or type of the detected objects/items 210a'-210n' may be varied to meet the design criteria of a particular implementation.

The camera system 100 may be configured to detect the windshield 210a' of oncoming traffic. For example, when the camera system 100 detects the windshield 210a', the signal CONTROL may be generated to initiate a change in the orientation of the beams 154a-154b to direct the beams 154a-154b away from the oncoming traffic (e.g., to avoid blinding and/or prevent a reduction in visibility of a driver of an oncoming vehicle).

The camera system 100 may be configured to detect one or more lane markers. For example, the lane marker 210a of the road 54 in the example view 200 may be a divider between oncoming traffic. In the example alternate view 200', the lane marker 210b' may be a divider between multiple lanes of the road 54' for traffic traveling in the same direction as the vehicle 50. For example, the signal STATUS may detect a turn signal (e.g., a right turn signal) initiated by the driver. The signal VIDEO may detect the lane marker 210b' indicating a lane to the right of the vehicle 50. Based on the signal VIDEO and/or the signal STATUS the processor 106 and/or the processor 122 may determine the driver is attempting to change lanes.

The processor 106 and/or the processor 122 may be configured to predict the future/destination lane based in the turn signal and/or the lane marker 210b'. The signal CONTROL may be generated to change the orientation of the beams 154a-154b to illuminate the right lane (e.g., the future/destination lane) to improve a visibility of the driver while performing a lane change. As the driver moves the vehicle 50 from the left lane to the right lane, the lane marker 210b' may be tracked in the signal VIDEO and the orientation of the beams 154a-154b may be adjusted (e.g., continuously adjusted, continually, periodically, etc.) as the vehicle 50 moves.

The utility pole 210n' may be a representation of an object/item detected to a side of the road 54'. In some situations, illuminating the objects/items to the side of the road 54' may improve safety for the driver. In one example, a series of utility poles to the side of the road 54' may not need special attention and the beams 154a-154b may not perform reorientation based on a detection of the utility pole 210n'. However, in another example of the object/item 210n' being detected as an animal (e.g., a deer that may suddenly cross the road) or a vehicle stranded on the side of the road 54', the beams 154a-154b may be adjusted to illuminate the object/item 210n'.

For example, the camera system 100 may detect a stranded vehicle based on a shape of the stranded vehicle and/or flashing emergency lights. In another example, the camera system 100 may detect an emergency vehicle pulled over to the side of the road 54' based on police and/or ambulance lights flashing and/or road flares. Generally, safety of police and/or emergency crews pulled over is a concern. Adjusting the orientation of the beams 154a-154b to improve illumination of police, emergency workers and/or construction workers on roadways and/or to the side of roadways may improve safety.

Figure 6:
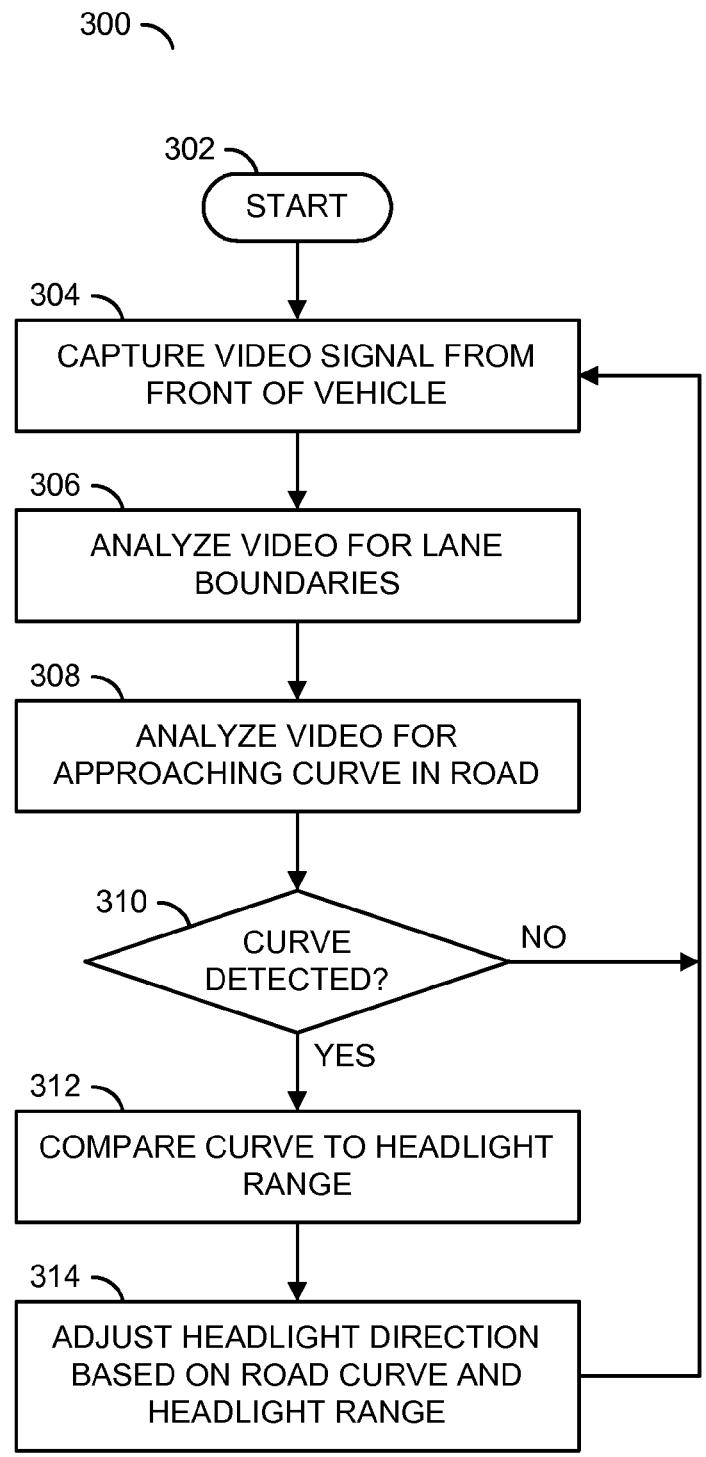
FIG. 6 is a flow diagram illustrating a method for automatic beam-shaping based on a detected roadway curve.

Referring to FIG. 6, a method (or process) 300 is shown. The method 300 may perform an automatic adjustment of the headlights 152a-152b and/or the beams 154a-154b based on a detected roadway curve. The method 300 generally comprises a step (or state) 302, a step (or state) 304, a step (or state) 306, a step (or state) 308, a decision step (or state) 310, a step (or state) 312, and a step (or state) 314.

The state 302 may be a start state. The state 304 may capture a video signal from the front of the vehicle 50. The state 306 may analyze the video for lane boundaries. Next, the state 308 may analyze the video for approaching curves in the road 54. For example, the curve 210b detected in the example view 200. Next, the method 300 may move to the decision state 310.

The decision state 310 determines whether the curve 52 has been detected. If not, the method 300 moves back to the state 304. If so, the method 300 moves to the state 312. The state 312 compares the detected curve 210b to the range of the headlights 152a-152b. Next, the state 314 adjusts the direction of the headlights 152a and 152b based on the detected road curve 210b and/or the range of the headlights 152a-152b.

The video frames may be analyzed for lane boundaries. For example, the lane boundaries may be one of the lane markers 210a and/or 210b' and/or other lane boundaries such as a solid line running alongside the road 54 may be used. Other detected objects/items may be used to determine the lane boundaries. For example, the sign 210n may indicate a side of the road 54. In another example, the utility pole 210n' may indicate a side of the road 54.

Generally, one factor alone may not determine a detection of the lane boundaries and/or the curve 52. For example, the camera system 100 may aggregate information from the various detected objects/items. For example, the communication device 110 may provide location information such as GPS map data indicating an upcoming curve. In another example, the communication device 110 may receive position information from an approaching vehicle and/or a vehicle ahead on the road 54 through vehicle to vehicle communication to indicate an upcoming curve. Based on the aggregated information a determination may be made. For example, the camera system 100 may determine a detected curve 210b with a low confidence level (e.g., the curve 52 may be present, but the video frames do not provide a clear enough image to make a determination. However, based on the detected road sign 210n and the detected curve 210b the curve 52 may be detected with a greater confidence level. The number of factors used and/or a confidence level threshold implemented to determine a detected object/item may be varied according to the design criteria of a particular implementation.

The camera system 100 may determine a range and/or orientation of the headlight beams 154a-154b. For example, the range of the beams 154a-154b may be stored in the memory 108 based on the make/model of the vehicle 50. In another example, the speed of the vehicle 50 determined using the vehicle sensors may be used to determine a range of the beams 154a-154b (e.g., determine whether the driver is overdriving the range of the headlights 152a-152b). The orientation of the beams 154a-154b may be determined based on the signal STATUS. For example, the signal STATUS may comprise information on the current orientation of the headlights 152a-152b and/or the beams 154a-154b. Based on the current orientation, a relative amount of adjustment of the beams 154a-154b may be determined.

Figure 7:
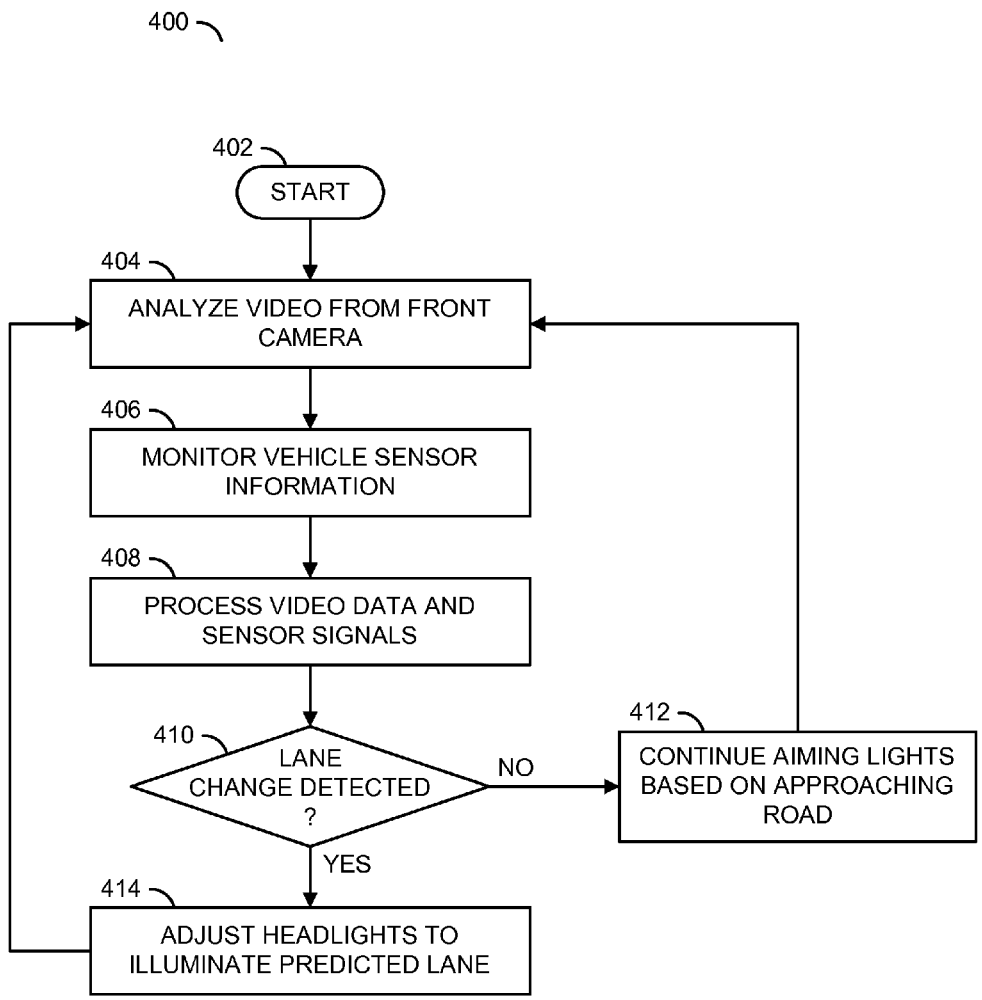
FIG. 7 is a flow diagram illustrating a method for automatic beam-shaping based on a detected lane change.

Referring to FIG. 7, a method (or process) 400 is shown. The method 400 may perform automatic beam-shaping based on a detected lane change. The method 400 generally comprises a step (or state) 402, a step (or state) 404, a step (or state) 406, a step (or state) 408, a decision step (or state) 410, a step (or state) 412, and a step (or state) 414. The state 402 may be a start state. The state 404 may analyze the video from the front camera (e.g., using the lens 112 mounted on the front of the vehicle 50). The state 406 may monitor sensor information from the vehicle 50 (e.g., turn indicators, steering wheel input, brake input, speed, etc.). The state 408 may process the video data and/or sensor signals. Next, the method 400 may move to the decision state 410.

The decision state 410 determines whether a lane change has been detected. If not, the method 400 moves to the step 412. The step 412 continues aiming the headlights 152a and/or 152b based on the approaching road 54 (e.g., the orientation of the beams 154a-154b remains unchanged and/or unaffected based on lane changing information). The method 400 then moves back to the state 404. If the decision state 410 determines that a lane change has been detected, the method 400 moves to the state 414. The state 414 adjusts the headlights 152a and 152b to illuminate the predicted (e.g., future) lane. The method 400 then moves back to the state 404.

In some embodiments, the automatic adjustment of the beams 154a-154b may be performed without input from the steering wheel. Information from some of the sensors of the vehicle 50 provide additional information (e.g., improve a confidence level of the object/item detection). For example, a turn signal and/or a turning of the signal may increase a confidence level of a detected lane change. Generally, the camera system 100 uses the sensors of the vehicle 50 to determine the current orientation of the headlights 152a-152b and/or the beams 154a-154b. For example, the status information may be a turn signal and the turn signal may be used to predict the future lane of travel of the vehicle 50. The adjustment of the headlights 152a-152b and/or the beams 154a-154b may respond to the prediction of the future lane (e.g., adjust to the right or left based on the status information and/or the detected lane marker 210b'). For example, the beams 154a-154b may be adjusted to illuminate the future lane in addition to (or instead of) the current lane.

Figure 8:
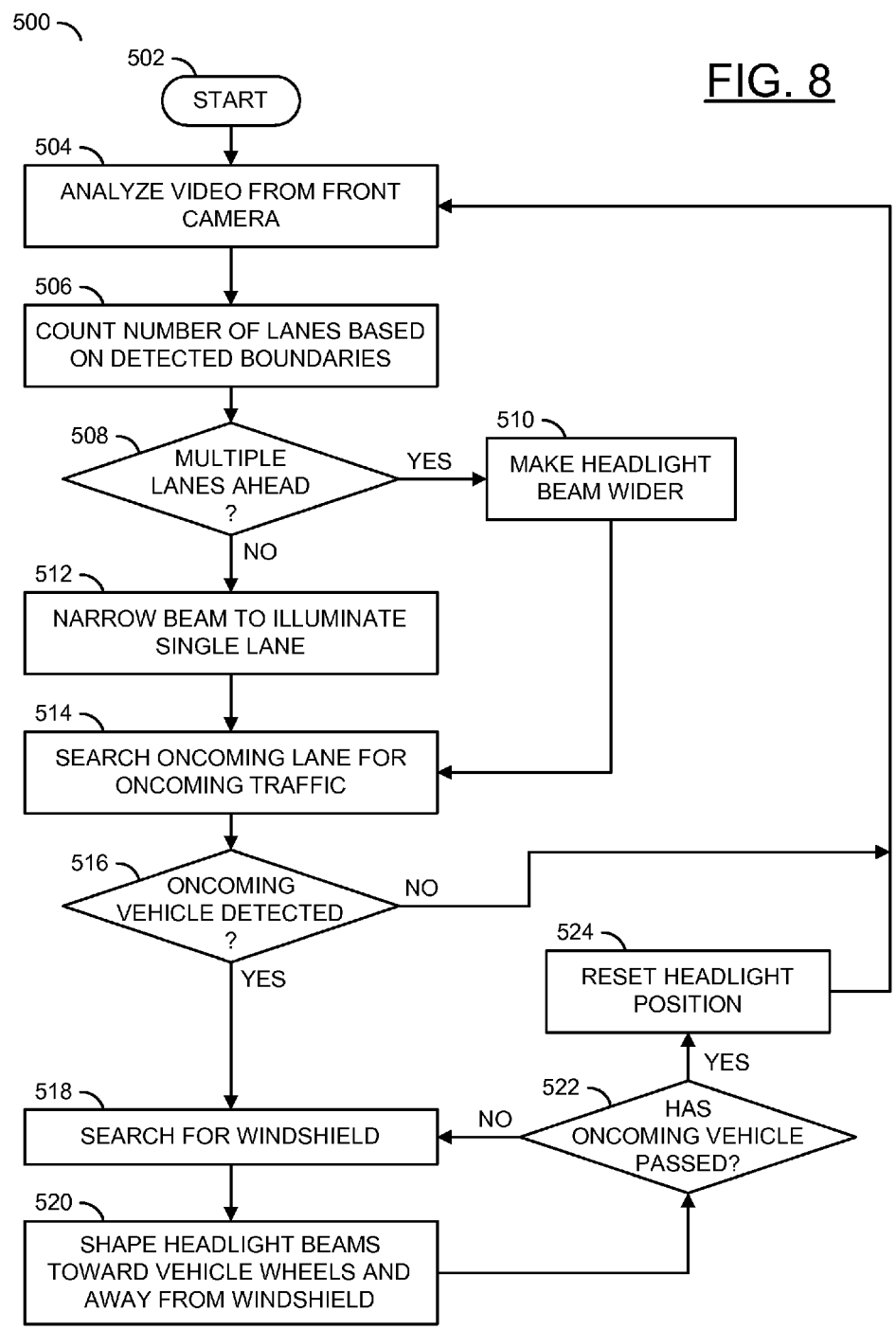
FIG. 8 is a flow diagram illustrating a method for automatic beam-shaping based on a detected oncoming vehicle.

Referring to FIG. 8, a method (or process) 500 is shown. The method 500 may perform automatic beam-shaping of the beams associated with the headlights 152a and/or 152b based on a detected oncoming vehicle. The method 500 generally comprises a step (or state) 502, a step (or state) 504, a step (or state) 506, a decision step (or state) 508, a step (or state) 510, a step (or state) 512, a step (or state) 514, a decision step (or state) 516, a step (or state) 518, a step (or state) 520, a decision step (or state) 522, and a step (or state) 524.

The state 502 may be a start state. The state 504 may analyze video received from the front camera 112. The state 506 may count the number of lanes based on one or more detected boundaries (e.g., the lane marker 210b'). Next, the decision state 508 determines whether there are multiple lanes in the road 54' ahead. If so, the method 500 moves to the state 510. If not, the method 500 moves to the state 512.

In the state 510, the method 500 makes the headlight beam wider (e.g., the signal CONTROL comprises instructions for the headlights 152a-152b to shape a wider beam). After the state 510, the method 500 moves to the state 514. The state 512 narrows the beam to illuminate a single lane. Next, the method 500 moves to the state 514. The state 514 searches the oncoming lane for oncoming traffic. Next, the method 500 may move to the decision state 516.

The decision state 516 determines if a vehicle is detected in the oncoming lanes. If not, the method 500 moves back to the state 504. If so, the method 500 moves to the state 518. The state 518 searches the video for a windshield (e.g., the detected windshield 210a'). Next, the state 520 shapes the beams 154a-154b of the headlights 152a and/or 152b towards the wheels and/or away from the windshield of the oncoming vehicle. Next, the method 500 may move to the decision state 522.

The decision state 522 determines whether the oncoming vehicle has passed. If not, the method 500 moves back to the state 518. If so, the method 500 moves to the state 524. The state 524 resets the position of the headlights 152a and/or 152b (e.g., returns the orientation of the beams 154a-154b to a default orientation based on the road 54' and/or any other detected objects/items). After the state 524, the method 500 moves back to the state 504.

Figure 9:
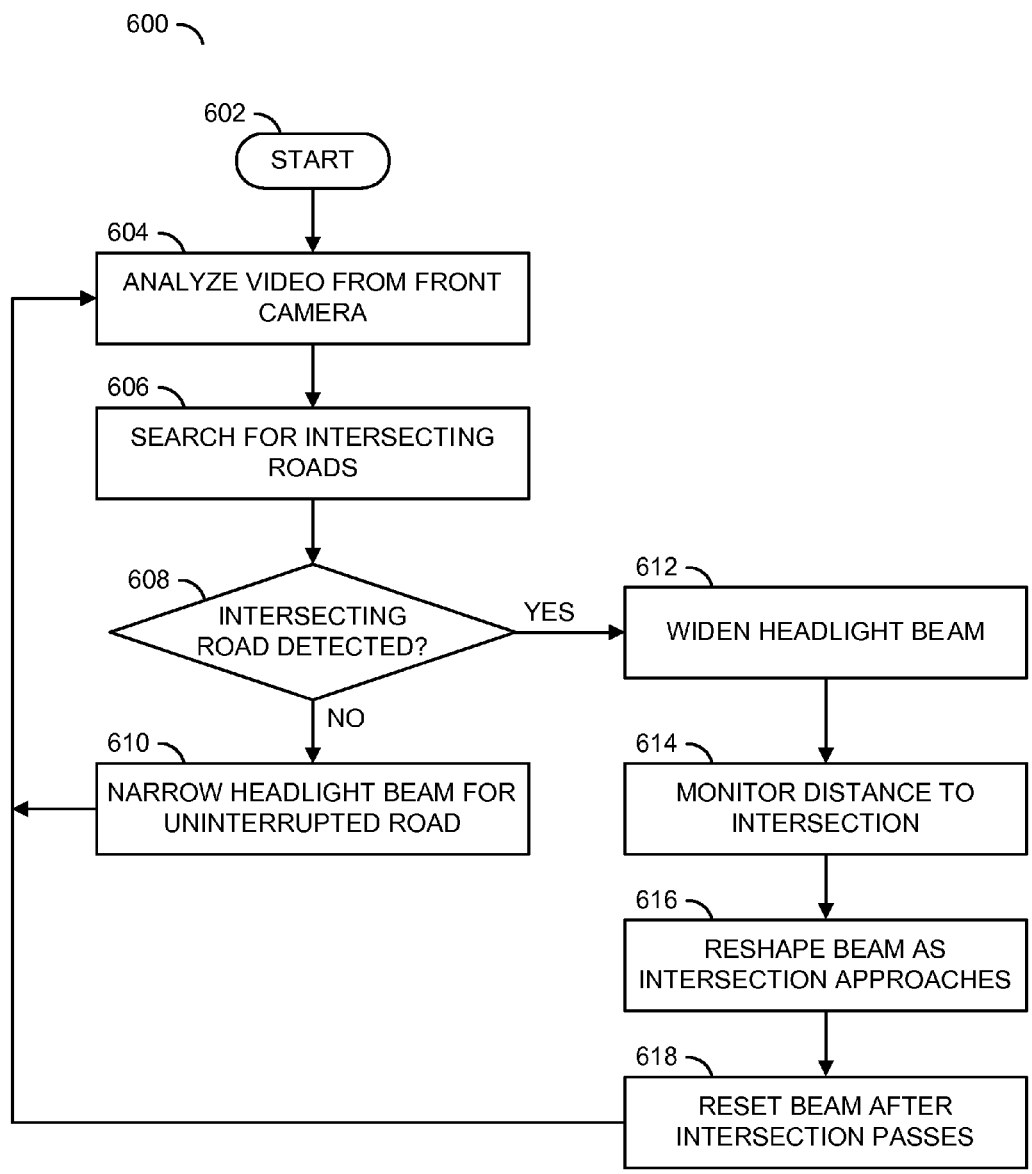
FIG. 9 is a flow diagram illustrating a method for automatic beam-shaping based on a detected roadway intersection.

Referring to FIG. 9, a method (or process) 600 is shown. The method 600 may perform automatic beam-shaping based on a detected roadway intersection. The method 600 generally comprises a step (or state) 602, a step (or state) 604, a step (or state) 606, a decision step (or state) 608, a step (or state) 610, a step (or state) 612, a step (or state) 614, a step (or state) 616, and a step (or state) 618. The state 602 may be a start state. The state 604 may analyze the video from the front camera (e.g., the capture device 102). Next, the state 606 may search for intersecting roads. Next, the method 600 may move to the decision state 608.

The decision state 608 determines whether an intersecting road has been detected. If not, the method 600 moves to the state 610. If so, the method 600 moves to the state 612. The state 610 narrows the beam of the headlights 152a and/or 152b for an uninterrupted road. The method 600 then moves back to the state 604. If the decision state 608 determines that there is an intersecting road, the method 600 moves to the state 612. The state 612 widens the beams 154a-154b of the headlights 152a and/or 152b. Next, the state 614 monitors the distance to the intersection. Next, the state 616 reshapes the beams 154a-154b as the intersection approaches. Next, the state 618 resets the beams 154a-154b after the intersection has passed. Then the method 600 moves back to the state 604.

Figure 10:
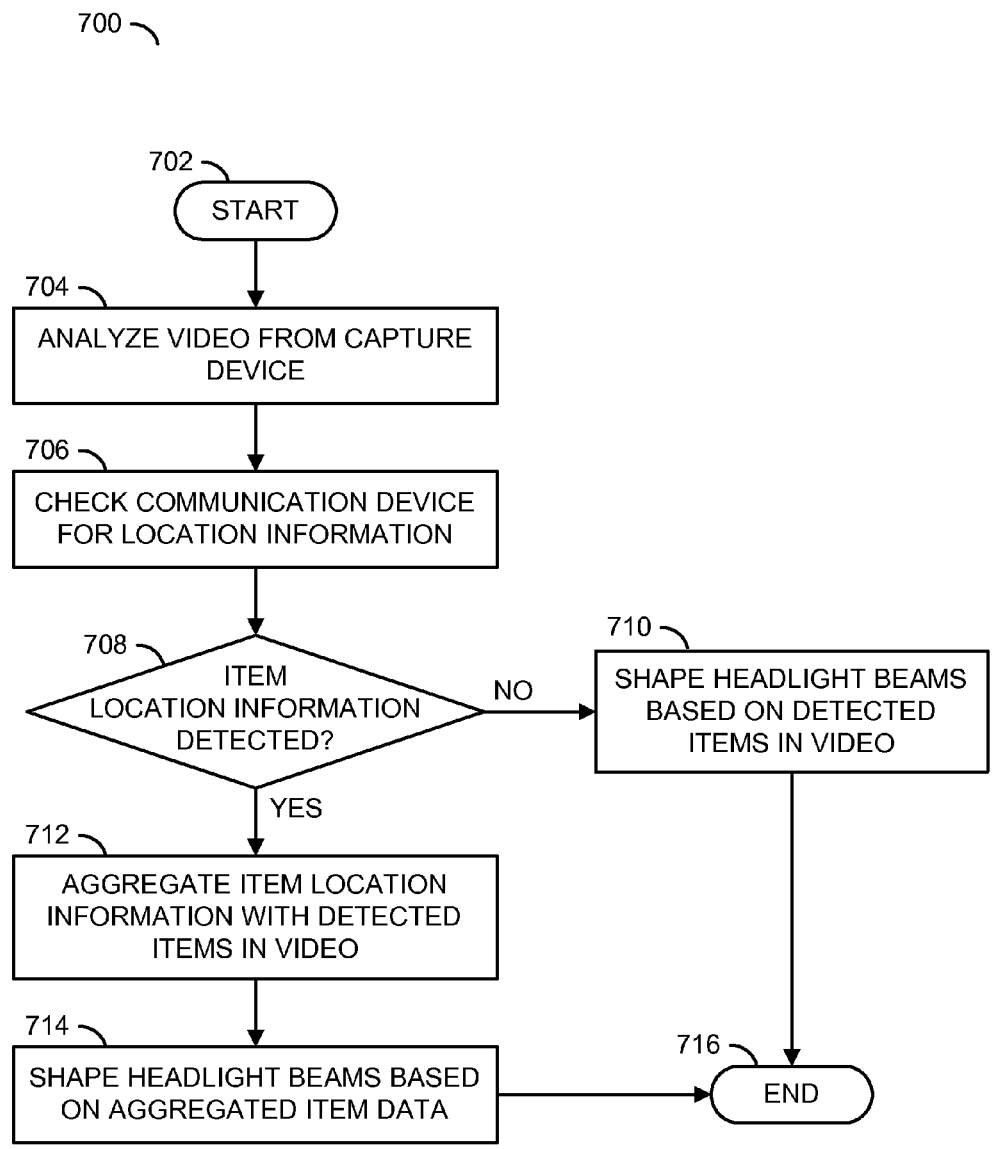
FIG. 10 is a flow diagram illustrating a method for automatic beam-shaping based on location information received by a communication device.

Referring to FIG. 10, a method (or process) 700 is shown. The method 700 may perform automatic beam-shaping based on location information received by the communication device 110. The method 700 generally comprises a step (or state) 702, a step (or state) 704, a step (or state) 706, a decision step (or state) 708, a step (or state) 710, a step (or state) 712, a step (or state) 714, and a step (or state) 716. The state 702 may be a start state. Next, the state 704 may analyze video detected by the capture device 102. The state 706 may check the communication device 110 for location information (e.g., received from a GPS satellite, received by other vehicles and/or any other objects/items). Next, the method 700 may move to the decision state 708.

The decision state 708 may determine whether any item (object) location information has been detected. If not, the method 700 may move to the state 710. If so, the method 700 may move to the state 712. The state 710 may shape the headlight beams 154a-154b based on the detected objects/items in the video (e.g., the adjustment may be based on a lower level of confidence). Next, the method 700 may move to the state 716. In the state 712, the camera system 100 may aggregate the received object/item location information with the data from the detected objects/items in the video. Next, the state 714 may shape the headlight beams 154a-154b based on the aggregated object/item data (e.g., the adjustment may be based on a higher level of confidence). Next, the method 700 may move to the state 716. The state 716 may end the method 700.

The processor 106 and/or the processor 122 may be configured to analyze video detected by the capture device 102. For example, the processor 106 and/or the processor 122 may perform a classification of the objects/items detected in the signal VIDEO. For example, the classification may be performed by comparing the detected objects/items with objects/items stored in the memory 108 (e.g., pre-classified objects). The method of classification of the objects/items in the video may be varied according to the design criteria of a particular implementation. The adjustment of the headlights 152a-152b and/or the beams 154a-154b may be based on a presence of and/or a determined location of the objects/items in the video. In some embodiments, the camera system 100 may be configured to estimate a distance of the classified objects from the vehicle 50 (e.g., based on the reference size of the object and the detected size of the object). The adjustment of the headlights 152a-152b and/or the beams 154a-154b may be based on the distance estimate.

The camera system 100 may be configured to use information from front facing cameras (e.g., the capture device 102 using one or more of the lenses 112). In some embodiments, cameras facing other directions from the vehicle 50 may be implemented. The camera system may be configured to recognize lane boundaries and/or which lane the vehicle 50 is currently occupying. The capture device 102 may capture video data. The processors 106 and/or 122 may analyze the video data to recognize the beginning of curves and/or a radius of the curve.

The camera system 100 may receive data from the sensors of the vehicle 50 using the interface 104. The sensors of the vehicle 50 may provide information on a current range of the headlights 152a-152b. If the beginning of the curve occurs within the current range of the headlights 152a-152b (e.g., less than 30 m for low beams and less than 100 m for high beams), the beams 154a-154b corresponding to the headlights 152a-152b may be shaped to illuminate both the straight segment of the road 54 leading to the curve 52 and/or the curved segment of the road 54 following the curve 52.

The camera system 100 may be configured to use additional information from the controls of the vehicle 50 (e.g., the OBD port). For example, the interface 104 may transmit the signal STATUS comprising information such as the use of turn signals and/or steering wheel position to predict which lane or turn direction the vehicle 50 will most likely move to in the near future. For example, the camera system 100 may shape the beams 154a-154n to illuminate the predicted lane as well as the current lane of the vehicle 50.

The orientation and/or shape of the beams 154a-154b may be adjusted based on detected objects/items in the video frames. For example, the detected objects/items may be perpendicular roads and/or driveways (e.g., roadways from which crossing traffic may appear). The camera system 100 may shape the beams 154a-154b to partially illuminate the exit from the perpendicular roads and/or driveways. For example, a wider shape for the beams 154a-154b may be used to increase the amount of illumination at a detected driveway to help the driver see a vehicle potentially backing out of a driveway. In some embodiments, the shape of the beams 154a-154b may be narrower when traveling on uninterrupted roads (e.g., straight paths with no oncoming vehicles detected) and wider when approaching intersections.

In some embodiments, the camera system 100 may be configured to count and/or determine a number of lanes on the road 54. For example, the detected objects/items may be the lane markers 210a used to differentiate various lanes on the road 54. The camera system 100 may shape the beams 154a-154b to be wider when the road 54 has more lanes and narrower when the road 54 has fewer lanes.

In some embodiments, the camera system 100 may be configured to detect objects/items such as road signs and/or vehicles on the shoulder of the road. Other objects/items may be detected indicating changing conditions and/or warnings (e.g., construction signs, pylons, orange road cones, pedestrians, emergency response vehicles, tow trucks, animals, road flares, etc.). The beams 154a-154b may be shaped to illuminate the objects/items. The distance to the detected objects/items may be determined (e.g., based on an increasing and/or decreasing number of pixels of the object in each sequential frame). Based on the changing distance to the detected object(s)/item(s) the shape of the beams 154a-154b may be continuously and/or periodically re-shaped to illuminate the same object(s)/item(s) as the vehicle 50 approaches the detected object(s)/item(s).

In some embodiments, the camera system 100 may be configured to detect an outline of another vehicle (e.g., traffic). For example, if the detected vehicle is outside of a current coverage/illumination area of the beams 154a-154b, the beams 154a-154b may be shaped to illuminate the detected vehicle. The beams 154a-154b may be shaped to illuminate the wheels and/or bumper of the detected vehicle (e.g., directed downwards) so as to not shine light at the wind-shield of the detected vehicle.

In some embodiments, the camera system 100 may be configured to use location-data from vehicle-to-vehicle and/or vehicle-to-infrastructure communication. For example, the communication device 110 may be configured to receive information (e.g., location information such as GPS map data) regarding an exact location of various objects/items. For example, the communication device 110 may receive location information of other vehicles and/or infrastructure (e.g., traffic lights, fire hydrants, parking spaces, roadways, etc.). Based on the location information, the beams 154a-154b may be shaped to illuminate the objects/items.

The functions performed by the diagrams of FIGS. 6-10 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDS (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMS), EEPROMs (electrically erasable programmable ROMs), UVPROM (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the scope of the invention.

The invention claimed is:

1. An apparatus comprising:
a sensor configured to generate a video signal based on a targeted view from a vehicle from a perspective of a driver;
an interface configured to receive status information from one or more components of said vehicle; and
a processor configured to (i) perform video analysis on video frames of said video signal to detect objects, (ii) perform a classification of said objects, (iii) provide a confidence level of said classification and (iv) generate a control signal in response to (a) said classification of said objects and (b) said status information, wherein (A) said control signal is used to reshape a beam of one or more headlights of said vehicle, (B) said reshaping of said beams of said headlights is determined by aggregating information based on (i) a location of said objects in said video signal, (ii) said confidence level of said classification and (iii) said status information and (C) said status information is used to adjust said confidence level of said classification of said objects.

2. The apparatus according to claim 1, wherein (i) said status information comprises a turn signal, (ii) said turn signal is used to predict a future lane of travel of said vehicle and (iii) said reshaping of said beams of said headlights responds to said prediction of said future lane.

3. The apparatus according to claim 1, wherein said objects comprise at least one of road markings, traffic, road signs, other vehicles, pedestrians, animals and a path of upcoming roadways.

4. The apparatus according to claim 1, wherein (i) said sensor is a front facing camera attached to said vehicle and (ii) said sensor is implemented as one of (a) a component of a camera and (b) a video capturing device.

5. The apparatus according to claim 1, wherein said processor is further configured to receive a plurality of said video signals from a plurality of said sensors.

6. The apparatus according to claim 1, wherein (i) said status information comprises at least one of (a) a current orientation of said headlights, (b) a turn signal, (c) a speed of said vehicle, (d) a position of a steering wheel, (e) location information received from a GPS satellite and (f) location information received from another vehicle and (ii) said status information is received through an on-board diagnostics port.

7. The apparatus according to claim 1, wherein said confidence level is adjusted in response to a second classification of a second object detected in said video frame.

8. The apparatus according to claim 1, wherein (i) one of said objects detected by said video analysis is a curve in a roadway and (ii) said beams of said headlights of said vehicle are reshaped to illuminate said curve in said roadway.

9. The apparatus according to claim claim 8, wherein said confidence level of said classification of said curve is increased in response to reading a road sign using said video analysis.

10. The apparatus according to claim 8, wherein said confidence level of said classification of said curve in said roadway is detected adjusted based on at least one of (i) lane markers, (ii) a shape of said roadway, (iii) road signs detected in said video signal and (iv) position information of an approaching vehicle received through a vehicle to vehicle identification system.

11. The apparatus according to claim 8, wherein said beams of said headlights of said vehicle are reshaped based on at least one of a range of said headlights and a shape of said curve in said roadway.

12. The apparatus according to claim 1, wherein (i) one of said objects detected is a second vehicle and (ii) said beams of said headlights of said vehicle are adjusted to illuminate said second vehicle.

13. The apparatus according to claim 12, wherein (i) said second vehicle is an oncoming vehicle, (ii) said apparatus is configured to detect a windshield of said oncoming vehicle and (iii) said beams of said headlights of said vehicle are reshaped to direct light away from said windshield of said oncoming vehicle.

14. The apparatus according to claim 12, wherein said second vehicle is at least one of a vehicle on a side of a road and an emergency vehicle.

15. The apparatus according to claim 1, wherein (i) one of said objects detected is a lane boundary, (ii) said beams of said headlights of said vehicle are adjusted to illuminate a lane based on said lane boundary and (iii) said lane is detected based on at least one of said lane boundary and said status information.

16. The apparatus according to claim 1, wherein (i) one of said objects detected is an intersecting roadway and (ii) said headlights of said vehicle are adjusted to create a wider beam when approaching said intersecting roadway.

17. The apparatus according to claim 1, wherein (i) said status information comprises GPS may data, (ii) said object comprises a shape of a road and (iii) said GPS map data confirms said classification of said shape of said road.

18. The apparatus according to claim 1, wherein (i) said location is calculated based on a comparison of a current size of said objects detected in a current video frame to a reference size of a reference object and (ii) said reference object is retrieved from a look up table based on said classification of said objects.

19. The apparatus according to claim 18, wherein said look up table is updateable.

20. The apparatus according to claim 1, wherein said classification of said objects is based on recognizing said objects in a said video frame of said video signal.

* * * * *